United States Patent [19]
Bickel

[11] 4,314,740
[45] Feb. 9, 1982

[54] OPTICAL FIBER BEAM SPLITTER COUPLER

[75] Inventor: Gary W. Bickel, Roanoke, Va.

[73] Assignee: International Telephone and Telegraph Corporation, New York, N.Y.

[21] Appl. No.: 147,641

[22] Filed: May 7, 1980

[51] Int. Cl.³ .............................................. G02B 5/172
[52] U.S. Cl. ................................ 350/96.15; 350/96.33
[58] Field of Search ................ 350/96.15, 96.16, 96.33

[56] References Cited

U.S. PATENT DOCUMENTS

| 4,134,642 | 1/1979 | Kapron et al. | 350/96.33 |
| 4,149,770 | 4/1979 | Milton et al. | 350/96.15 |
| 4,176,908 | 12/1979 | Wagner | 350/96.15 |
| 4,252,403 | 2/1981 | Salisbury | 350/96.33 |

FOREIGN PATENT DOCUMENTS 2032132  4/1980  United Kingdom ............ 350/96.16

OTHER PUBLICATIONS

D. McMahon et al. "Distributive Tee Couplers" in Applied Physics Letts. vol. 28, No. 7, Apr. 1976, pp. 396-398.

Primary Examiner—John D. Lee
Attorney, Agent, or Firm—John T. O'Halloran; Alfred C. Hill

[57] ABSTRACT

The optical fiber beam splitter coupler disclosed includes in the first half thereof a first optical fiber having a first core coaxial of a longitudinal axis and a first cladding disposed concentric to and outside the first core. The second half of the coupler includes a concentric core fiber having an inner core coaxial of the longitudinal axis, an inner cladding concentric to and outside the inner core, an outer core concentric to the inner cladding and an outer cladding concentric to the outer core. The adjacent ends of the first fiber and the concentric fiber are polished at 45° angles complementary to one another and are abutted end-to-end to provide an interface therebetween. A mirror surface is deposited on the interface so as to cover either the adjacent end of the outer core or the inner core of the concentric fiber. This arrangement enables the coupling of two different light beams into and/or out of the coupler. Several embodiments are disclosed.

22 Claims, 8 Drawing Figures

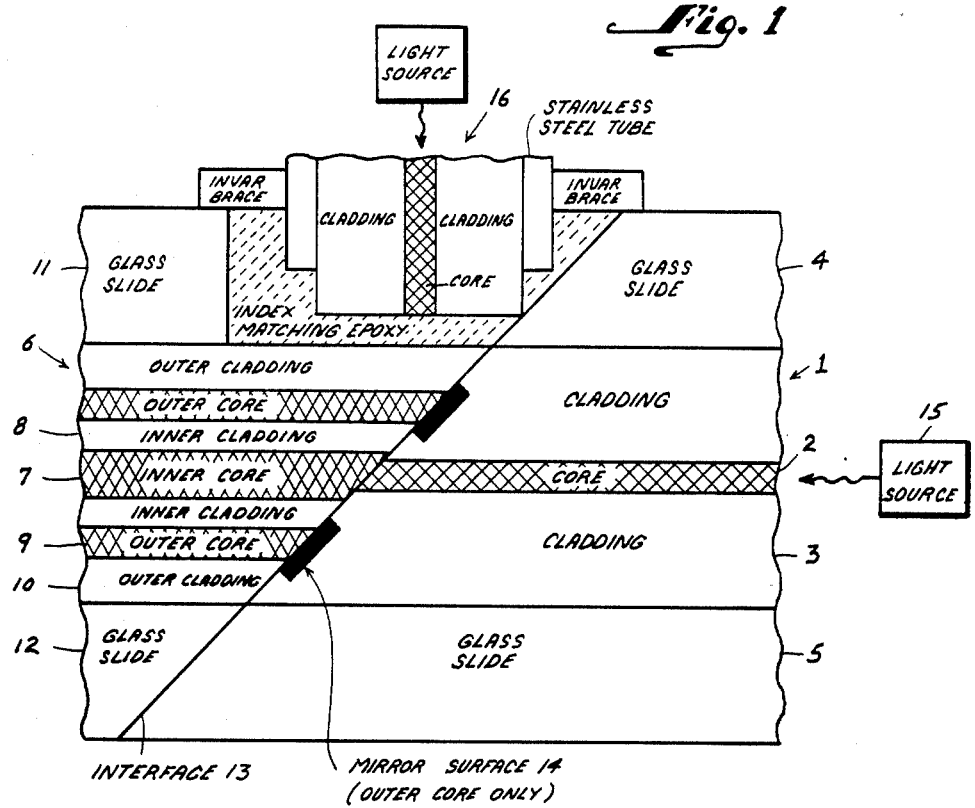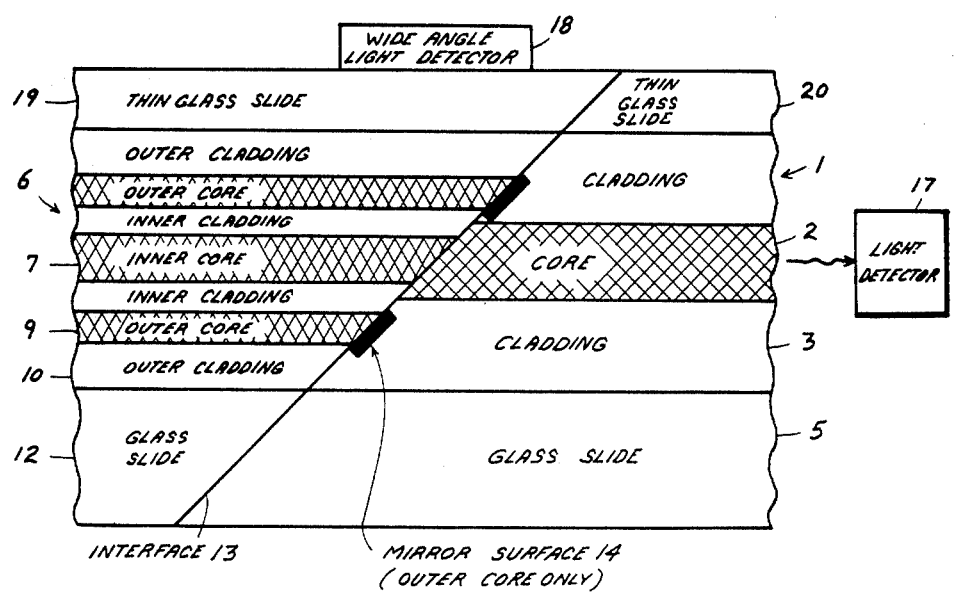

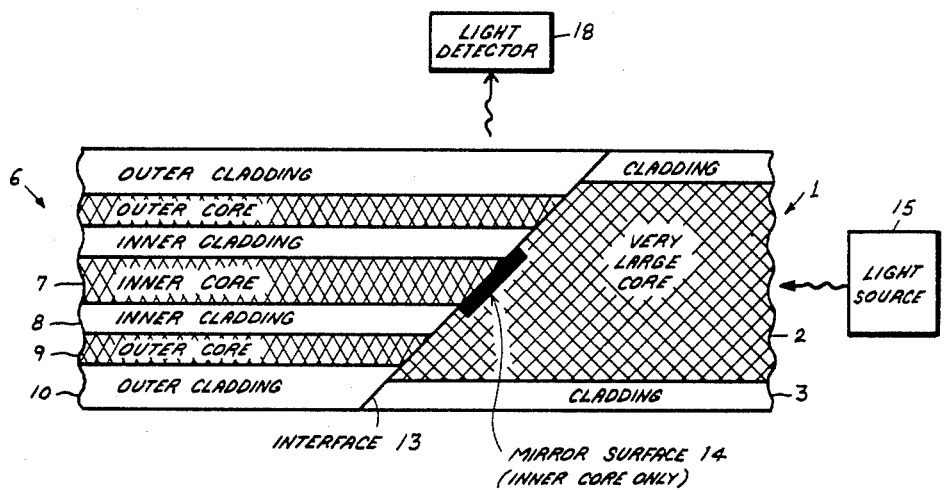
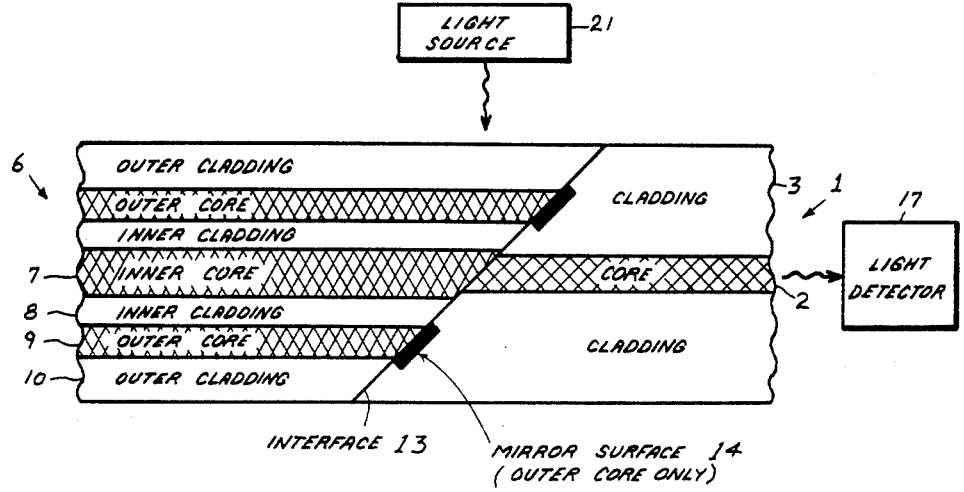

OPTICAL FIBER BEAM SPLITTER COUPLER

BACKGROUND OF THE INVENTION

This invention relates to optical fibers and more particularly to an optical fiber coupler of the beam splitter type.

Copending patent application Ser. No. 074,923, filed Sept. 13, 1979 and Ser. No. 117,425, filed Feb. 1, 1980, of the instant inventor, whose disclosures are incorporated herein by reference, each disclose a different embodiment of an optical fiber coupler of the beam splitter type employing a reflective surface at the interface between two abutting single core optical fibers with the interface being angled 45° with respect to the longitudinal axis of the two abutting optical fibers to provide the desired three port optical fiber coupler of the beam splitter type.

Optical fiber couplers for concentric core optical fibers have in the past used very small diameter optical fibers. For instance, two such fibers on the transmitter end and a bundle of such fibers on the receiver end with the optical fiber on the central core separated out from the bundle of optical fibers before going to utilization means, such as, a light detector or a third branch fiber.

SUMMARY OF THE INVENTION

An object of the present invention is to provide an optical fiber beam splitter employing one concentric core optical fiber in one half of the coupler of the beam splitter type.

Another object of the present invention is to provide an optical fiber beam splitter coupler employing the techniques of the above-identified copending applications modified to incorporate a concentric core optical fiber in one half of the coupler.

A further object of the present invention is to provide an optical fiber beam splitter coupler which is an improvement over the prior known couplers employing concentric core optical fibers.

A feature of the present invention is the provision of an optical fiber beam splitter coupler comprising a first optical fiber having a first core coaxial of a longitudinal axis and a first cladding concentric to and outside the first core, one end of the first fiber making a given angle with respect to the axis; a second optical fiber having an inner core coaxial of the axis, an inner cladding concentric to and outside the inner core, an outer core concentric to and outside the inner cladding and an outer cladding concentric to and outside the outer core, one end of the second fiber making an angle with respect to the axis complementary to the given angle and abutting the one end of the first fiber to provide an interface therebetween; and a mirror surface disposed at the interface to cover the adjacent end of one of the inner core and the outer core to reflect light impinging thereon into or out of the first fiber.

BRIEF DESCRIPTION OF THE DRAWING

Above-mentioned and other features and objects of this invention will become more apparent by reference to the following description taken in conjunction with the accompanying drawing, in which:

FIG. 1 is a schematic illustration of a first embodiment of an optical fiber beam splitter coupler in accordance with the principles of the present invention enabling transmission of two different light beams in the inner and outer cores in the same direction of transmission operable as an input coupler;

FIG. 2 is a schematic illustration of a second embodiment of the optical fiber beam splitter coupler in accordance with the principles of the present invention enabling transmission of two different light beams in the inner and outer cores in the same direction of transmission operable as an output coupler;

FIG. 5 is a schematic illustration of an optical fiber beam splitter coupler in accordance with the principles of the present invention enabling transmission of two different light beams in the inner and outer cores in opposite directions of transmission operable in a bidirectional communication link;

FIG. 6 is a schematic illustration of a sixth embodiment of the optical fiber beam splitter coupler in accordance with the principles of the present invention which is an alternative to the embodiment of FIG. 5;

DESCRIPTION OF THE PREFERRED EMBODIMENTS

Figure 3:
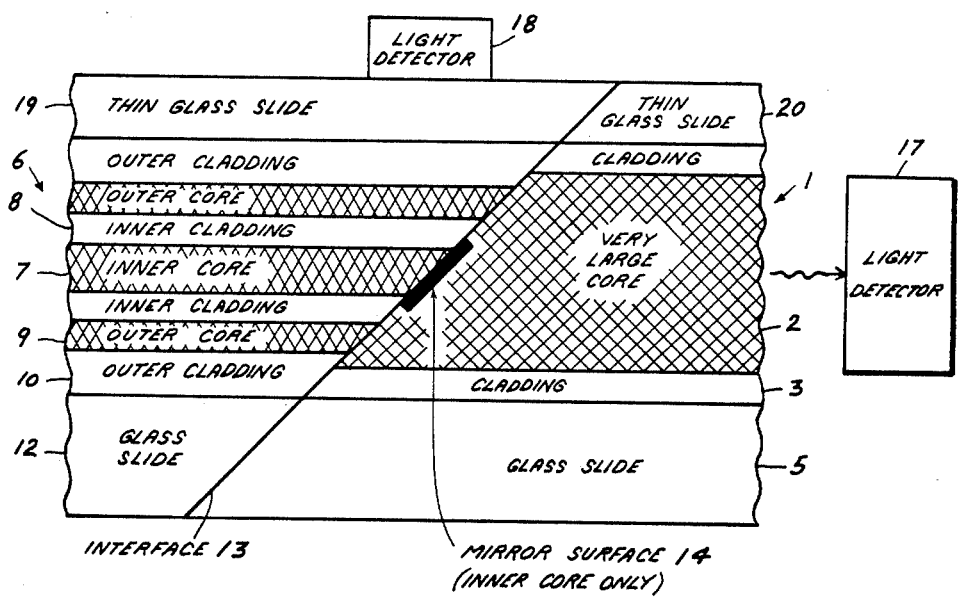
FIG. 3 is a schematic illustration of a third embodiment of the optical fiber beam splitter coupler in accordance with the principles of the present invention which is an alternative to the embodiment of FIG. 2.

Like components of the optical fiber beam splitter coupler of the present invention will be identified by the same reference character in each of the embodiments described hereinbelow.

Referring to FIG. 1, there is illustrated therein one embodiment of an optical fiber beam splitter coupler which may be used as an input coupler in accordance with the principles of the present invention. This coupler permits two different light beams to be transmitted in the same direction over two different paths. The coupler of FIG. 1 includes a first optical fiber 1 including a first core 2 and a cladding 3 concentric to core 2 and the longitudinal axis of core 2. Fiber 1 is sandwiched between glass slides 4 and 5 and has the end thereof polished at a given angle, preferably a 45° angle. The other half of the coupler includes a concentric core fiber 6 having an inner core 7, an inner cladding 8 disposed concentric to inner core 7 and the common longitudinal axis of core 2. Concentric to inner cladding 8 is an outer core 9 and concentric thereto is an outer cladding 10. Fiber 6 is the type of fiber and is produced in a manner disclosed in U.S. Pat. No. 4,000,416, issued Dec. 28, 1976, whose disclosure is incorporated herein by reference. Fiber 6 is also sandwiched between glass slides 11 and 12 with the end thereof adjacent fiber 1 polished at an angle complementary to the given angle. In the case of the given angle equalling 45° the complementary angle would also have an angle of 45°. Fibers 1 and 6 abut each other as illustrated providing an interface 13 therebetween with a mirror surface 14 being deposited by a selected photo-lithographic process at interface 13 to cover the end of outer core 9 only.

In this arrangement a first light beam at a given frequency would be supplied from light source 15 for transmission in core 2 which light beam would be injected into inner core 7 at the un-mirrored portion of interface 13 for transmission therein. A second light beam having the same frequency as the first light beam, or a different frequency than the first frequency of the light beam may be injected into outer core 9 by employing a third optical fiber 16 in which the second light beam is transmitted from the outside of the coupler. Fiber 16 is positioned at right angles to the longitudinal axis of the coupler when interface 13 is at a 45° angle. The light beam from fiber 16 is reflected from mirror surface 14 to inject the second light beam into outer core 9 for transmission therein in the same direction as the first light beam is transmitted in inner core 7. Alternatively, a large area light source, such as a surface emitting light emitting diode could be used in the place of the optical fiber 16 for injecting a second light beam into the coupler of FIG. 1.

Referring to FIG. 2, there is illustrated therein an optical fiber beam splitter coupler employed as an output coupler incorporating the teaching of the present invention. In this arrangement of the coupler of the present invention, a first light beam is propagated in inner core 7 toward interface 13. The first light beam is injected into core 2 at the un-mirrored portion of interface 13 for propagation in core 2 to a light detector 17 or other utilization means, such as an additional optical fiber or an extension of fiber 1. Light propagated in outer core 9 of fiber 6 toward interface 13 is reflected from mirror surface 14 toward a wide angle light detector 18, or other utilization means, such as a third branching fiber through a thin glass slide 19 replacing glass slide 11 of FIG. 1. A complementary thin glass slide 20 would replace glass slide 4 of FIG. 1.

Referring to FIG. 3, there is disclosed therein an alternative to FIG. 2 with the mirror surface 14 being deposited on interface 13 to cover only inner core 7 of fiber 6. With this arrangement a first light beam in inner core 7 is reflected by mirror surface 14 to light detector 18 while a second light beam propagated in outer core 9 would be injected into core 2 of fiber 1, which is relatively large, for propagation of the second light energy in core 2 to light detector 17, or another utilization means. Like FIG. 2, the embodiment of FIG. 3 is an output coupler for two different light beams transmitted in the same direction.

Figure 4:
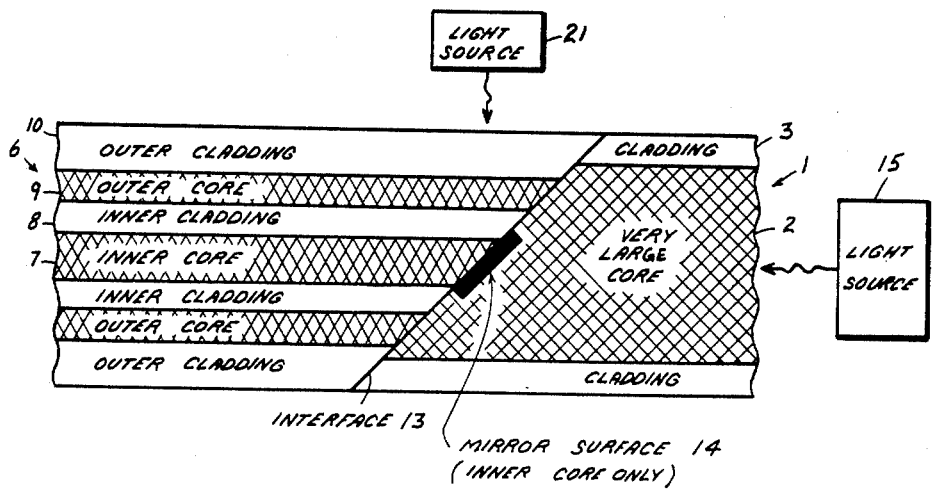
FIG. 4 is a schematic illustration of a fourth embodiment of the optical fiber beam splitter coupler in accordance with the principles of the present invention which is an alternative to the embodiment of FIG. 1.

Referring to FIG. 4, there is illustrated therein an alternative to the embodiment of FIG. 1 with the glass slides 4, 5, 11 and 12 and fiber 16 removed. In this embodiment two different light beams are transmitted in the same direction by having a first light beam supplied from source 15 injected into core 2, which is very large, and, hence, into outer core 9 at interface 13. A second light beam from light source 21 impinges upon mirror surface 14 and is reflected into inner core 7 for propagation therein.

Referring to FIG. 5, there is illustrated therein a coupler in accordance with the principles of the present invention that will enable two-way propagation or transmission of two different light beams. A first light beam propagating an inner core 7 toward interface 13 is reflected from mirror surface 14 to light detector 18. A second light energy from source 15 is propagated in core 2, which is very large, toward interface 13 at which point the second light beam is injected into outer core 9 for propagation therein away from interface 13.

Referring to FIG. 6, another embodiment is illustrated which enables two-way transmission of two different light beams. In this embodiment a first light beam propagating in inner core 7 toward interface 13 is injected into core 2 of fiber 1 for propagation therein to light detector 17, or other utilization means. A second light beam from light source 21 impinges upon mirror surface 14 and is reflected into outer core 9 for propagation therein away from interface 13.

Figure 7:
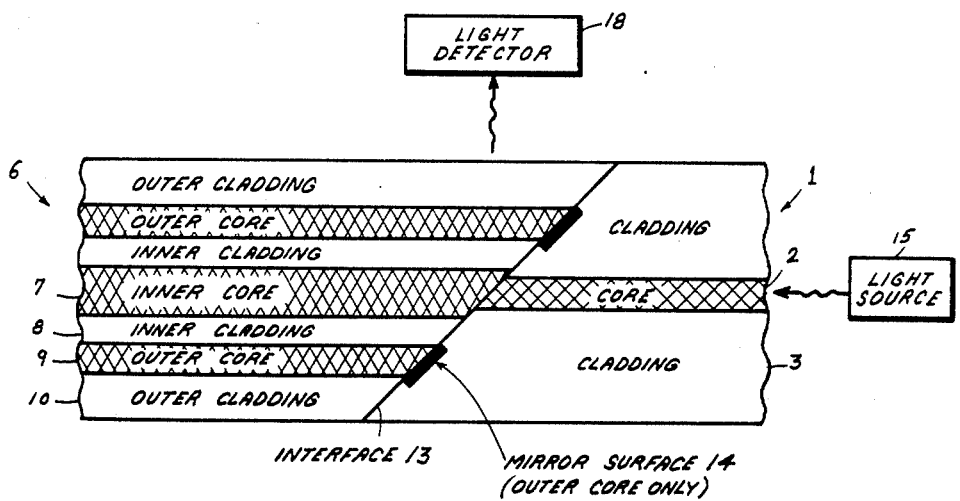
FIG. 7 is a schematic illustration of a seventh embodiment of an optical fiber beam splitter coupler in accordance with the principles of the present application for two-way transmission of two different light beams in the inner and outer cores which may be employed at the opposite end of a bidirectional communication link with the embodiment of FIG. 5 being employed at the other end of the bidirectional link.

Referring to FIG. 7, another embodiment of a two-way coupler in accordance with the principles of the present invention is illustrated. This coupler could be used at one end of a bidirectional communication link when the embodiment of FIG. 5 is employed at the other end of the bidirectional link. In this coupler the first light beam in outer core 9 is propagated toward interface 13 and reflected from mirror surface 14 to light detector 18, or some other utilization device, such as a third fiber. A second light beam from light source 15 is propagated in core 2 of fiber 1 toward interface 13 and injected into inner core 7 for propagation therein away from interface 13.

Figure 8:
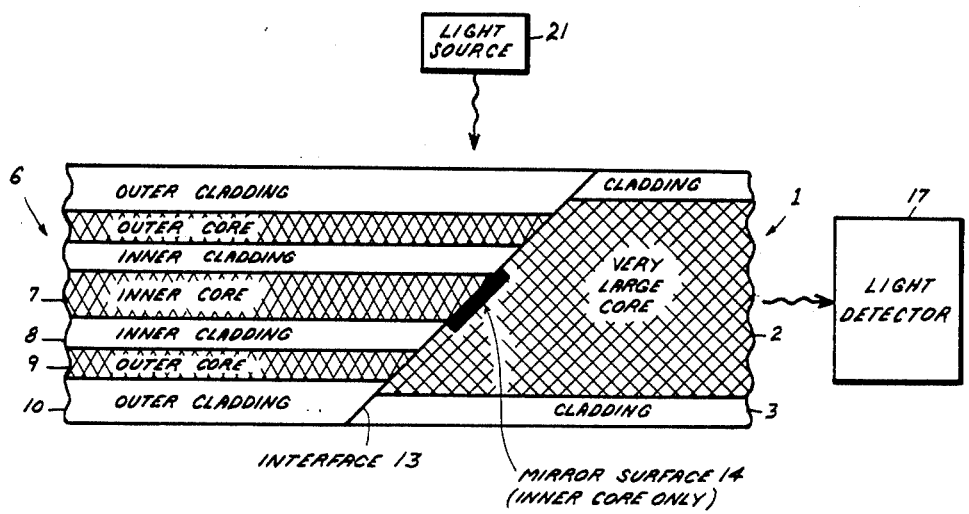
FIG. 8 is a schematic illustration of an eighth embodiment of an optical fiber beam splitter coupler in accordance with the principles of the present invention enabling two-way transmission of two different light beams in opposite directions on a bidirectional communication link which is employed at one end of the bidirectional link when the embodiment of FIG. 6 is employed at the other end of the bidirectional link.

Referring to FIG. 8, there is illustrated therein another two-way coupler which could be used at one end of a bidirectional communication link when the coupler of FIG. 6 is used at the other end of the bidirectional link. In this coupler a light beam in outer core 9 propagates therein toward interface 13 and is injected into core 2 at the un-mirrored portion of interface 13 for propagation therein to light detector 17, or some other utilization device, such as a continuation of fiber 1. A light beam from source 21 impinges upon mirror surface 14 and is reflected into inner core 7 for propagation therein away from interface 13.

The optical fiber beam splitter coupler disclosed in the instant application has a number of advantages over the earlier and known couplers employing concentric core fibers. (1) The coupler of the present invention eliminates the use of very small diameter fibers which are difficult to handle without breaking. (2) The coupler of the present invention offers much more flexibility as can be seen by the description of the various embodiments of FIGS. 1-8. (3) The fabrication process, although still requiring precision alignment in both the photo-lithographic and the final alignment process, is more controllable in the production of the coupler of the present invention. (4) Packaging of the coupler of the present invention becomes much easier, since only one or two very well protected fibers are used. Away from the specific coupling area, protective jackets may be left on the fibers involved as in other optical fiber beam splitter couplers.

While I have described above the principles of my invention in connection with specific apparatus it is to be clearly understood that this description is made only by way of example and not as a limitation to the scope of my invention as set forth in the objects thereof and in the accompanying claims.

I claim:

1. An optical fiber beam splitter coupler comprising:
a first optical fiber having a first core coaxial of a longitudinal axis and a first cladding concentric to and outside said first core, one end of said first fiber making a given angle with respect to said axis;
a second optical fiber having an inner core coaxial of said axis, an inner cladding concentric to and outside said inner core, an outer core concentric to and outside said inner cladding and an outer cladding concentric to and outside said outer core, one end of said second fiber making an angle with respect to said axis complementary to said given angle and abutting said one end of said first fiber to provide an interface therebetween;
a mirror surface disposed at said interface to cover the adjacent end of one of said inner core and said outer core to reflect light impinging thereon into or out of said first fiber; and
a selected one of an input means and a utilization means in an operative relationship with said mirror surface, said input means providing light for reflection into said first fiber and said utilization means receiving light reflected out of said first fiber.

2. A coupler according to claim 1, wherein said given angle is 45 degrees.

3. A coupler according to claim 2, wherein said mirror surface is disposed to cover said adjacent end of said outer core.

4. A coupler according to claim 3, wherein
light impinging on said mirror surface from said input means disposed outside said first and second fibers is reflected into said outer core for propagation therealong, and
light propagating in said first core is injected into said inner core for propagation therein.

5. A coupler according to claim 3, wherein
light propagating in said outer core is reflected by said mirror surface to said utilization means disposed outside said first and second fibers, and
light propagating in said inner core is injected into said first core for propagation therein.

6. A coupler according to claim 3, wherein
light impinging on said mirror surface from said input means disposed outside said first and second fibers is reflected into said outer core for propagation therein, and
light propagating in said inner core is injected into said first core for propagation therein.

7. A coupler according to claim 3, wherein
light propagating in said outer core is reflected by said mirror surface to said utilization means disposed outside said first and second fiber, and
light propagating in said first core is injected into said inner core of propagation therein.

8. A coupler according to claim 2, wherein said mirror surface is disposed to cover said adjacent end of said inner core.

9. A coupler according to claim 8, wherein
light propagating in said outer core is injected into said first core for propagation therein, and
light propagating in said inner core is reflected by said mirror surface to said utilization means disposed outside said first and second fibers.

10. A coupler according to claim 8, wherein
light propagating in said first core is injected into said outer core for propagation therein, and
light impinging on said mirror surface from said input means disposed outside said first and second fibers is reflected into said inner core for propagation therein.

11. A coupler according to claim 8, wherein
light propagating in said first core is injected into said outer core for propagation therein, and
light propagating in said inner core is reflected by said mirror surface to said utilization means disposed outside said first and second fibers.

12. A coupler according to claim 8, wherein
light impinging on said mirror surface from said input means disposed outside said first and second fibers is reflected into said inner core for propagation therein, and
light propagating in said outer core is injected into said first core for propagation therein.

13. A coupler according to claim 1, wherein said mirror surface is disposed to cover said adjacent end of said outer core.

14. A coupler according to claim 13, wherein
light impinging on said mirror surface from said input means disposed outside said first and second fibers is reflected into said outer core for propagation therein, and
light propagating in said first core is injected into said inner core for propagation therein.

15. A coupler according to claim 13, wherein
light propagating in said outer core is reflected by said mirror surface to said utilization means disposed outside said first and second fibers, and
light propagating in said inner core is injected into said first core for propagation therein.

16. A coupler according to claim 13, wherein
light impinging on said mirror surface from said input means disposed outside said first and second fibers is reflected into said outer core for propagation therein, and
light propagating in said inner core is injected into said first core for propagation therein.

17. A coupler according to claim 13, wherein
light propagating in said outer core is reflected by said mirror surface to said utilization means disposed outside said first and second fibers, and
light propagating in said first core is injected into said inner core for propagation therein.

18. A coupler according to claim 1, wherein said mirror surface is disposed to cover said adjacent end of said inner core.

19. A coupler according to claim 18, wherein
light propagating in said outer core is injected into said first core for propagation therein, and
light propagating in said inner core is reflected by said mirror surface to said utilization means disposed outside said first and second fibers.

20. A coupler according to claim 18, wherein
light propagating in said first core is injected into said outer core for propagation therein, and
light impinging on said mirror surface from said input means disposed outside said first and second fibers is reflected into said inner core for propagation therein.

21. A coupler according to claim 18, wherein
light propagating in said first core is injected into said outer core for propagation therein, and
light propagating in said inner core is reflected by said mirror surface to said utilization means disposed outside said first and second fibers.

22. A coupler according to claim 18, wherein
light impinging on said mirror surface from said input means disposed outside said first and second fibers is reflected into said inner core for propagation therein, and
light propagating in said outer core is injected into said first core for propagation therein.

* * * * *